(12) United States Patent
Jung et al.

(10) Patent No.: US 9,671,656 B2
(45) Date of Patent: Jun. 6, 2017

(54) LIQUID CRYSTAL DISPLAY

(71) Applicant: Samsung Display Co., Ltd., Yongin, Gyeonggi-Do (KR)

(72) Inventors: Jae Hoon Jung, Anyang-si (KR); Dan Bi Yang, Gunpo-si (KR); Min-Joo Han, Seoul (KR); Ji Phyo Hong, Pyeongtaek-si (KR); Ki Chul Shin, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 36 days.

(21) Appl. No.: 14/735,667

(22) Filed: Jun. 10, 2015

(65) Prior Publication Data
US 2016/0202577 A1    Jul. 14, 2016

(30) Foreign Application Priority Data

Jan. 8, 2015 (KR) .................. 10-2015-0002972

(51) Int. Cl.
G02F 1/1343 (2006.01)
G02F 1/1337 (2006.01)
G02F 1/1362 (2006.01)

(52) U.S. Cl.
CPC .. G02F 1/134363 (2013.01); G02F 1/133707 (2013.01); *G02F 1/13624* (2013.01); *G02F 2001/134345* (2013.01)

(58) Field of Classification Search
CPC ............ G02F 1/134363; G02F 2001/134345
See application file for complete search history.

(56) References Cited

U.S. PATENT DOCUMENTS

2009/0244425 A1* 10/2009 Jung ................. G02F 1/133753
349/48
2010/0302471 A1* 12/2010 Kim ................. G02F 1/134363
349/37
(Continued)

FOREIGN PATENT DOCUMENTS

CN    103969895 A    8/2014
EP    2 762 965 A1   8/2014
(Continued)

OTHER PUBLICATIONS

Tien, Kun-Cheng et al., "Premium Picture Quality by Super-Multi-Domain Polymer Sustained Alignment LCD Technology", AU Optronics Technology Center, Taiwan, R.O.C., SID 2012 Digest, pp. 371-374, ISSN 0097-966X/12/4301-0371 © 2012 SID.
(Continued)

*Primary Examiner* — Sang V Nguyen
(74) *Attorney, Agent, or Firm* — Innovation Counsel LLP

(57) ABSTRACT

There is provided a liquid crystal display including a pixel electrode including a first subpixel electrode and a second subpixel electrode. The first subpixel electrode includes a first cross stem portion positioned in a first subpixel region and first minute branches extending from the first cross stem portion, and includes first and second body portions that are positioned in a third subpixel region and separated from each other, and a plurality of first and second slit portions that extend from the first and second body portions, respectively. The second subpixel electrode includes a second cross stem portion positioned in a second subpixel region and second minute branches that extend from the second cross stem portion, and includes a third cross stem portion positioned in a third subpixel region and third minute branches that extend from the third cross stem portion.

16 Claims, 18 Drawing Sheets

(56) References Cited

U.S. PATENT DOCUMENTS

| | | | | |
|---|---|---|---|---|
| 2011/0157121 A1* | 6/2011 | Chan | ............... | G02F 1/13624 345/211 |
| 2013/0135572 A1* | 5/2013 | Park | ............ | G02F 1/134336 349/143 |
| 2013/0321483 A1* | 12/2013 | You | ............ | G09G 5/10 345/690 |
| 2014/0104523 A1* | 4/2014 | Jung | ............ | G02F 1/1343 349/41 |
| 2014/0211142 A1 | 7/2014 | Kim et al. | | |
| 2015/0070645 A1* | 3/2015 | Jeon | ............ | G02F 1/134336 349/143 |

FOREIGN PATENT DOCUMENTS

| | | | | |
|---|---|---|---|---|
| JP | 2004-037853 | | 2/2004 | |
| JP | 2014-149524 | | 8/2014 | |
| KR | 1020050060730 A | | 6/2005 | |
| KR | 100921450 | | 10/2009 | |
| KR | 1020100048706 A | | 5/2010 | |
| KR | 1020140097905 A | | 8/2014 | |
| KR | 2015-0029377 | * | 3/2015 | ........... G02F 1/1343 |

OTHER PUBLICATIONS

Ting, Tien-Lun et al., "A Novel Coupled Charge-Shared Structure on Polymer Sustained Alignment Mode", AU Optronics, Taiwan, R.O.C., IDW/AD 2012, pp. 941-944, ISSN-L 1883-2490/19/0941 © 2012 ITE and SID.

* cited by examiner

LIQUID CRYSTAL DISPLAY

CROSS-REFERENCE TO RELATED APPLICATION

This application claims priority to and the benefit of Korean Patent Application No. 10-2015-0002972 filed in the Korean Intellectual Property Office on Jan. 8, 2015, the entire contents of which are incorporated herein by reference.

BACKGROUND (a) Field

The present application relates to a liquid crystal display.

(b) Description of the Related Art

A liquid crystal display is one of flat panel displays that have been most widely used, includes two display panels on which a field generating electrode such as a pixel electrode and a common electrode is formed, and a liquid crystal layer disposed between the two display panels.

The liquid crystal display displays an image by applying a voltage to the field generating electrode to generate an electric field in the liquid crystal layer, determining alignment of liquid crystal molecules of the liquid crystal layer through the electric field, and controlling polarization of incident light.

The liquid crystal display also includes a switching device connected to each pixel electrode and a plurality of signals such as a gate line, a data line, etc. for controlling the switching device and for applying a voltage to the pixel electrode.

Among such liquid crystal displays, a vertically aligned (VA) mode liquid crystal display in which a major axis of liquid crystal molecules is disposed to be perpendicular to a display panel in a state in which an electric field is not applied has attracted much attention due to a higher contrast ratio and a wide reference viewing angle. Here, the reference viewing angle refers a luminance reversal critical angle between grays or a viewing angle with a contrast ratio of 1:10.

For this type of liquid crystal display, a method for changing transmittance by dividing one pixel into two subpixels and applying different voltages of the two respective subpixels has been proposed in order to approximate side visibility to front visibility.

However, when one pixel is divided into two subpixels and transmittance is changed for the two subpixels to approximate side visibility to front visibility, luminance is increased from low gray or high gray and it is difficult to represent gray at a lateral side, and thus a problem arises in that an image quality is degraded.

The above information disclosed in this Background section is only for enhancement of understanding of the background and therefore it may contain information that does not form the prior art that is already known in this country to a person of ordinary skill in the art.

SUMMARY

Embodiments have been made in an effort to provide a liquid crystal display having features of representing accurate gray in a low gray region while approximating side visibility to front visibility.

An exemplary embodiment provides a liquid crystal display including a first substrate, a pixel electrode positioned on the first substrate, including a first subpixel electrode and a second subpixel electrode, and divided into three subregions, a second substrate facing the first substrate, a common electrode disposed on the second substrate, and a liquid crystal layer positioned between the first substrate and the second substrate. The first subpixel electrode includes a first cross stem portion positioned in a first subpixel region and a plurality of first minute branches extending in a diagonal direction from the first cross stem portion. The first subpixel electrode further includes first and second body portions that are positioned in a third subpixel region and separated from each other, and a plurality of first and second slit portions that extend in a diagonal direction from the first and second body portions, respectively. The second subpixel electrode includes a second cross stem portion positioned in a second subpixel region and a plurality of second minute branches that extend in a diagonal direction from the second cross stem portion. The second subpixel electrode further includes a third cross stem portion positioned in a third subpixel region and a plurality of third minute branches that extend in a diagonal direction from the third cross stem portion.

The first subpixel electrode and the second subpixel electrode may be formed of a same material on a same layer level.

The first and second slit portions may be alternately disposed with the third minute branches.

The first and second slit portions and the third minute branches may be alternately disposed.

The third minute branches may be disposed between neighboring first slit portions, and the third minute branches may be disposed between neighboring second slit portions.

The first slit portions may be disposed between neighboring third minute branches, and the second slit portions may be disposed between neighboring third minute branches The first subpixel electrode may include a first connection portion connecting the first cross stem portion and the first body portion, and a second connection portion connecting the first cross stem portion and the second body portion.

The first body portion and the second body portion may be separated from each other based on the third cross stem portion.

The first body portion and the first slit portions may be disposed on the left of the third cross stem portion, and the second body portion and the second slit portions may be disposed on the right of the third cross stem portion.

Each of the first, second, and third cross stem portions may include a horizontal stem portion and a vertical stem portion that cross each other.

The first, second, and third minute branches may be disposed to make an angle of 40 to 50 degrees with respect to the horizontal stem portions.

Different voltages may be configured to be applied to the first subpixel electrode and the second subpixel electrode.

A voltage configured to be applied to the first subpixel electrode may be higher than a voltage configured to be applied to the second subpixel electrode.

A horizontal direction of an electric field may be configured to be formed between the first and second slit portions and the third minute branches.

The first subpixel electrode may further include a first edge portion that is connected to the first cross stem portion and the first minute branches along an edge.

The second subpixel electrode may further include a second edge portion that is connected to the second cross stem portion and the second minute branches along an edge.

It is to be understood that both the foregoing general description and the following detailed description of the inventive concept are exemplary and explanatory and are intended to provide further explanation of the inventive concept as claimed.

According to the aforementioned exemplary embodiment, the following effects may be achieved.

A display device according to an exemplary embodiment may improve visibility and simultaneously reduce manufacturing costs by forming a first subpixel electrode and a second subpixel electrode on the same layer level to divide a pixel electrode into three regions without division of the pixel electrode into separate layers.

In addition, according to exemplary embodiments, other features may be newly recognized.

DETAILED DESCRIPTION OF THE EMBODIMENTS

Figure 1:
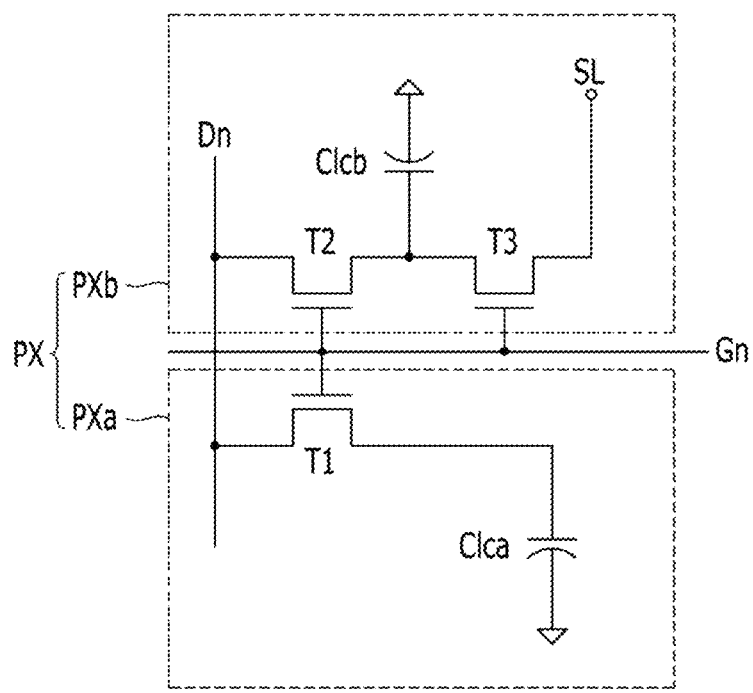
FIG. 1 is an equivalent circuit diagram of one pixel of a liquid crystal display according to an exemplary embodiment.

The inventive concept will be described more fully hereinafter with reference to the accompanying drawings, in which exemplary embodiments are shown. As those skilled in the art would realize, the described embodiments may be modified in various different ways, all without departing from the spirit or scope of the inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Hereinafter, a liquid crystal display according to an exemplary embodiment will be described in detail with reference to the accompanying drawings.

FIG. 1 is an equivalent circuit diagram of one pixel PX of a liquid crystal display according to an exemplary embodiment.

Referring to FIG. 1, the liquid crystal display according to an exemplary embodiment includes a plurality of signal lines Gn, Dn, and SL and a plurality of pixels PX connected thereto.

The signal lines Gn, Dn, and SL include a gate line Gn for transmitting gate signal (which may also be referred to as a "scanning signal"), a data line Dn for transmitting a data voltage, and a storage electrode line SL to which a constant voltage is applied.

A first thin film transistor T1 and a second thin film transistor T2 that are connected to the same gate line Gn and the same data line Dn are formed. In addition, a third thin film transistor T3 is connected to the second thin film transistor T2 and the storage electrode line SL is further formed.

Each pixel PX includes two subpixels PXa and PXb, a first liquid crystal capacitor Clca connected to the first thin film transistor T1 is formed in the first subpixel PXa, and a second liquid crystal capacitor Clcb connected to the second thin film transistor T2 is formed in the second subpixel PXb.

A first terminal of the first thin film transistor T1 is connected to the gate line Gn, a second terminal is connected to the data line Dn, and a third terminal is connected to the first liquid crystal capacitor Clca. A first terminal of the second thin film transistor T2 is connected to the gate line Gn, a second terminal is connected to the data line Dn, and a third terminal is connected to the second liquid crystal capacitor Clcb. A first terminal of the third thin film transistor T3 is connected to the gate line Gn, a second terminal is connected to the third terminal of the second thin film transistor T2, and a third terminal is connected to the storage electrode line SL.

With regard to an operation of a liquid crystal display according to an exemplary embodiment, when a gate-on voltage is applied to the gate line Gn, the first, second, and third thin film transistors T1, T2, and T3 connected to the gate line Gn are turned on, and the first liquid crystal capacitor Clca and the second liquid crystal capacitor Clcb are charged by a data voltage transmitted through the data line Dn.

In this case, since the third thin film transistor T3 is turned on, a portion of the voltage charged in the second liquid crystal capacitor Clcb escapes to the storage electrode line SL. Accordingly, even if data voltages transmitted to the first subpixel PXa and the second subpixel PXb through the data line Dn are the same, voltages charged in the first liquid crystal capacitor Clca and the second liquid crystal capacitor Clcb are different. That is, a voltage charged in the second liquid crystal capacitor Clcb is lower than a voltage charged in the first liquid crystal capacitor Clca. Accordingly, voltages charged in different subpixels PXa and PXb in the same pixel PX may be changed so as to improve side visibility.

Hereinafter, with reference to FIGS. 2 to 8, a configuration of a liquid crystal display according to an exemplary embodiment will be described.

Figure 2:
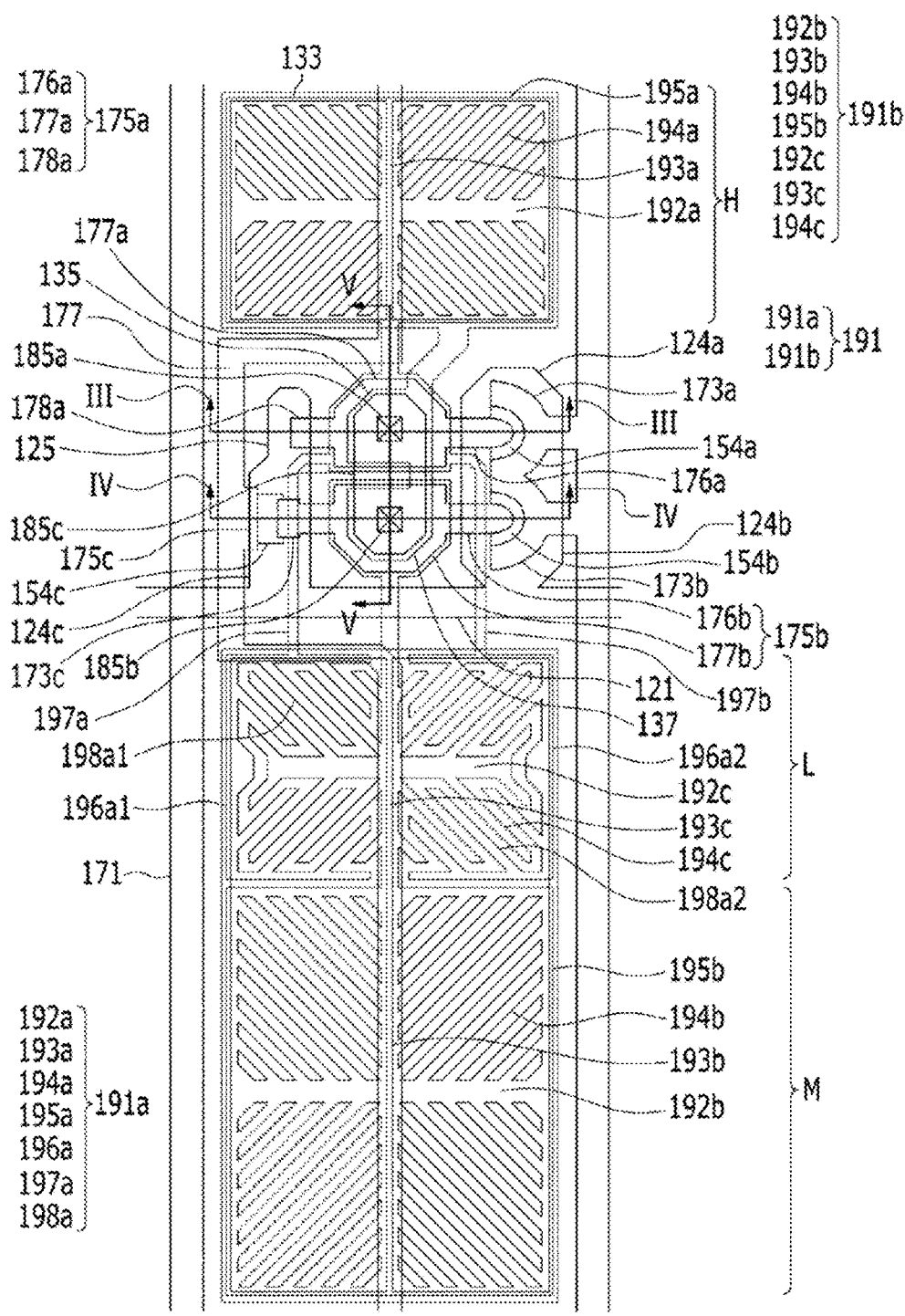
FIG. 2 is a top plan view of a liquid crystal display according to an exemplary embodiment.
Figure 3:
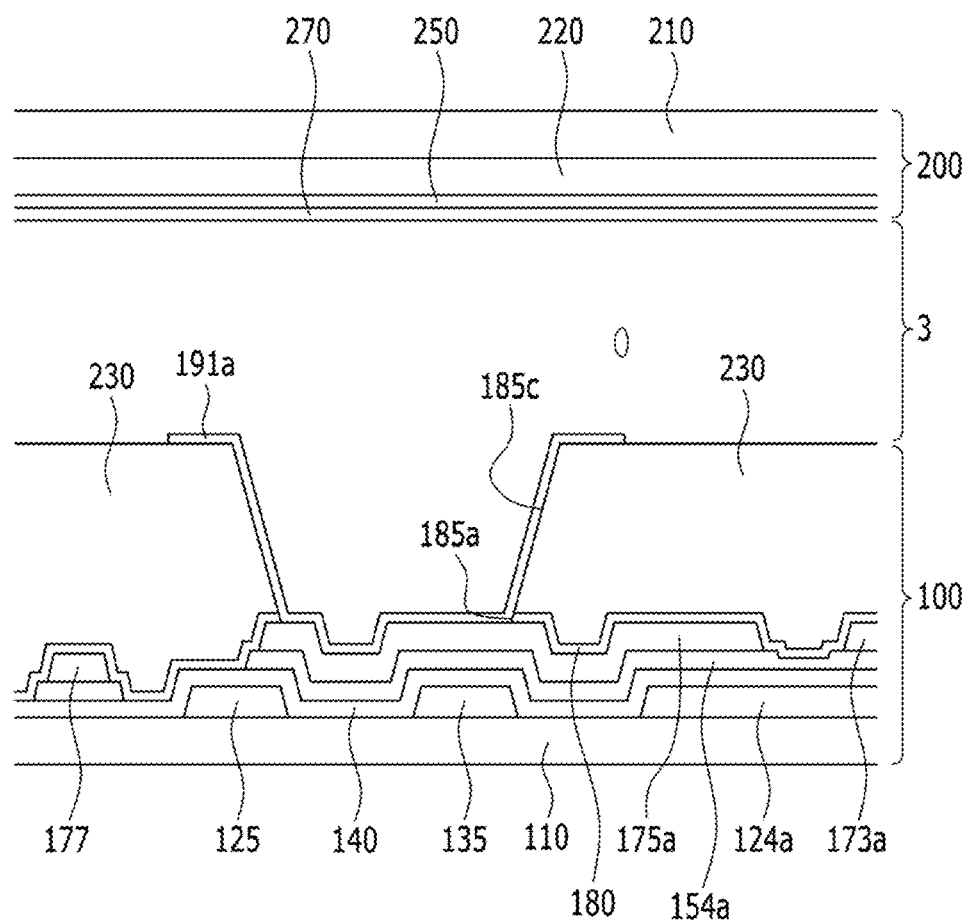
FIG. 3 is a cross-sectional view of a liquid crystal display taken along a line III-III of FIG. 2 according to an exemplary embodiment.
Figure 4:
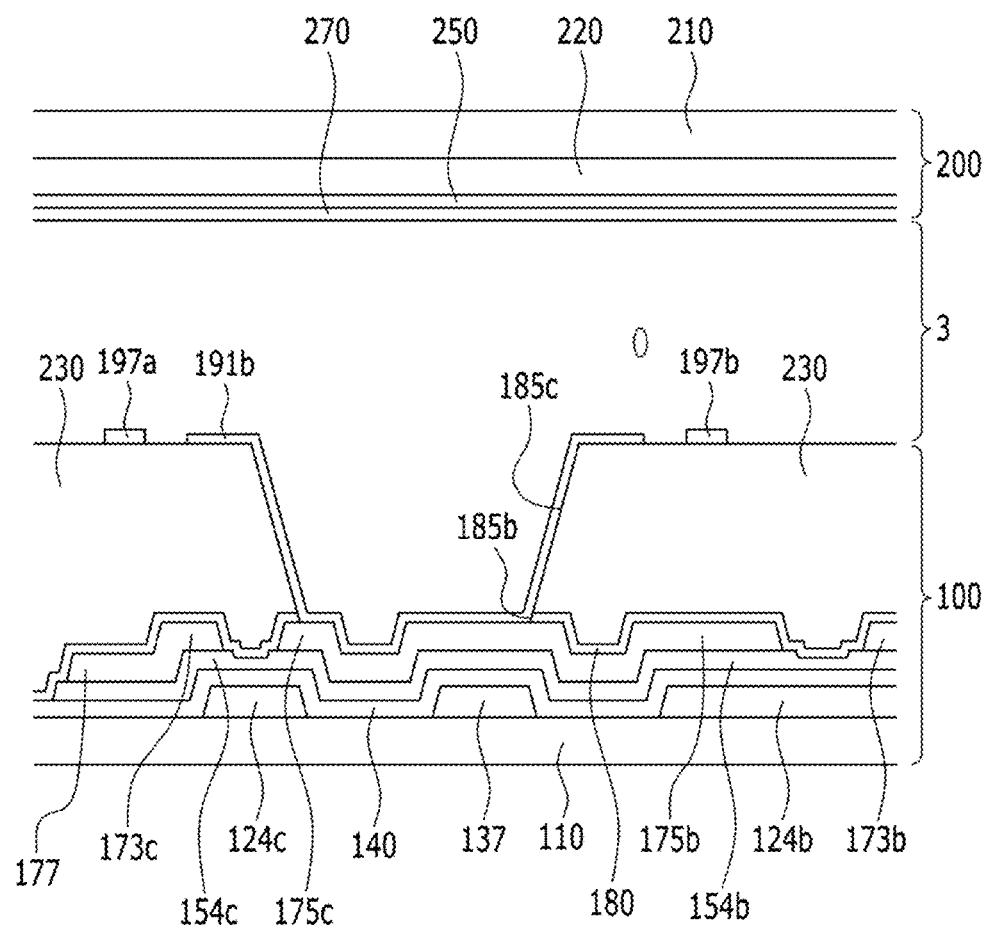
FIG. 4 is a cross-sectional view taken along a line IV-IV of FIG. 2.
Figure 5:
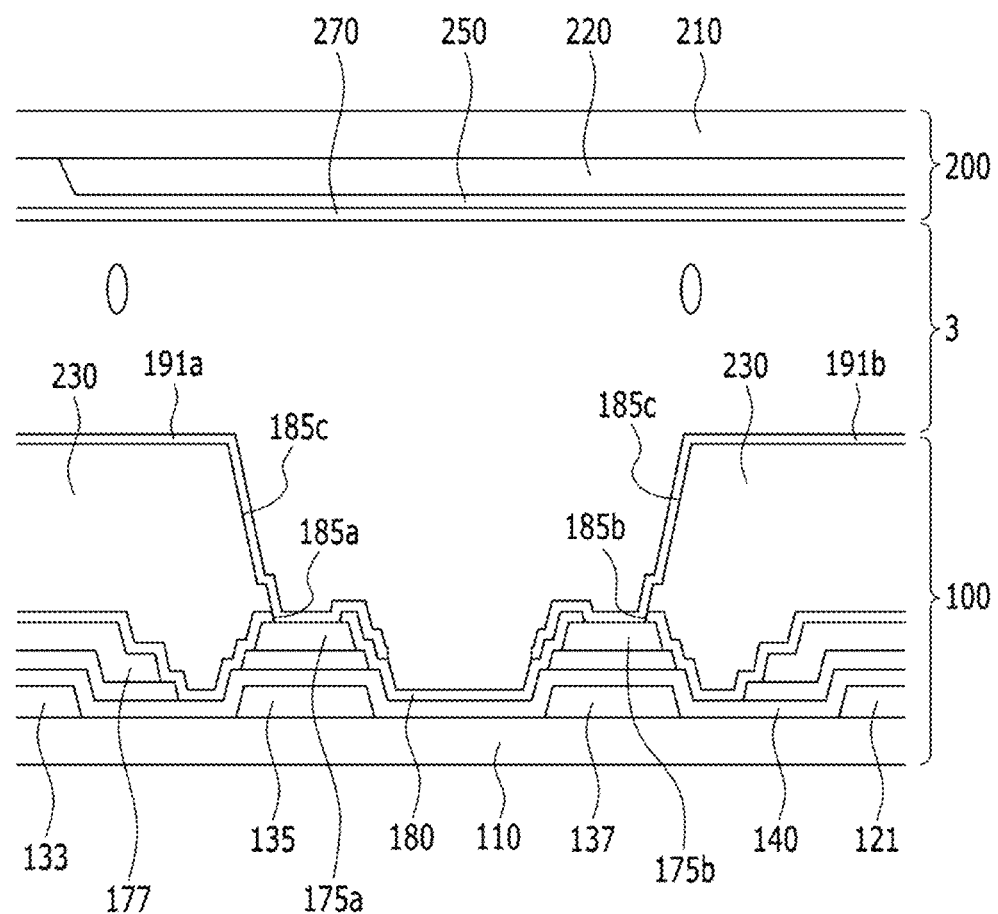
FIG. 5 is a cross-sectional view taken along a line V-V of FIG. 2.

FIG. 2 is a top plan view of a liquid crystal display according to an exemplary embodiment, FIG. 3 is a cross-sectional view of a liquid crystal display taken along a line III-III of FIG. 2 according to an exemplary embodiment, FIG. 4 is a cross-sectional view taken along a line IV-IV of FIG. 2, and FIG. 5 is a cross-sectional view taken along a line V-V of FIG. 2.

Referring to FIGS. 2 to 5, the liquid crystal display according to the present exemplary embodiment includes a lower panel 100 and an upper panel 200 that face each other, a liquid crystal layer 3 disposed between the two display panels 100 and 200, and a pair of polarizers (not shown) attached to outer surfaces of the display panels 100 and 200.

First, the lower panel 100 will be described.

A gate metal layer including a gate line 121, a first gate electrode 124a, a second gate electrode 124 b, an auxiliary electrode 125, and a third gate electrode 124c is formed on a first substrate 110 formed of transparent glass, plastic, or the like.

The gate line 121 mainly extends in a horizontal direction and transmits a gate signal. The first gate electrode 124a and the second gate electrode 124b protrude from the gate line 121 to be connected to each other. The first gate electrode 124a and the second gate electrode 124b protrude upward on a plane from the gate line 121, and the first gate electrode 124a may be positioned above the second gate electrode 124b. The auxiliary electrode 125 and the third gate electrode 124c protrude from the gate line 121 to be connected to each other. The auxiliary electrode 125 and the third gate electrode 124c may protrude upward from the gate line 121 on a plane, and the auxiliary electrode 125 may be positioned above the third gate electrode 124c.

The first gate electrode 124a and the auxiliary electrode 125 are spaced apart from each other by a predetermined interval. The second gate electrode 124b and the third gate electrode 124c are spaced apart from each other by a predetermined interval.

The first gate electrode 124a, the second gate electrode 124b, the third gate electrode 124c, and the auxiliary electrode 125 are connected to the same gate line 121 and receive the same gate signal.

A storage electrode 133 may be further formed on the first substrate 110. The storage electrode 133 may be formed to surround edges of the two subpixels PXa and PXb.

In addition, the storage electrode 133 may be further formed in a center of each of the two subpixels PXa and PXb in a vertical direction. The plurality of storage electrodes 133 positioned in neighboring pixels PX are connected to each other. A constant voltage such as a command voltage is applied to the storage electrode 133.

A first electrode 135 and a second electrode 137 may extend from the storage electrode 133 and may be further formed. The first electrode 135 is positioned between the first gate electrode 124a and the auxiliary electrode 125, and the second electrode 137 is positioned between the second gate electrode 124b and the third gate electrode 124c. The first electrode 135 and the second electrode 137 are connected to the storage electrode 133 and receive a constant voltage.

A gate insulating layer 140 is formed on the gate line 121, the first gate electrode 124a, the second gate electrode 124b, the third gate electrode 124c, the storage electrode 133, the first electrode 135, and the second electrode 137. The gate insulating layer 140 may be formed of an inorganic insulating material such as silicon nitride ($SiN_x$) or silicon oxide ($SiO_x$). The gate insulating layer 140 may include a single layer or a multilayer.

A first semiconductor 154a, a second semiconductor 154b, and a third semiconductor 154c are formed on the gate insulating layer 140. The first semiconductor 154a may be positioned on the first gate electrode 124a, the second semiconductor 154b may be positioned on the second gate electrode 124b, and the third semiconductor 154c may be positioned on the third gate electrode 124c.

The first semiconductor 154a, the second semiconductor 154b, and the third semiconductor 154c may be formed of amorphous silicon, polycrystalline silicon, or metal oxide.

Although not illustrated, an ohmic contact may be further positioned on each of the first semiconductor 154a, the second semiconductor 154b, and the third semiconductor 154c. The ohmic contact may be formed of a material such as n+ hydrogenated amorphous silicon doped with a high concentration of n-type impurity or silicide.

A data metal layer including a storage electrode line 177, a data line 171, a first source electrode 173a, a first drain electrode 175a, a second source electrode 1731b, a second drain electrode 175b, a third source electrode 173c, and a third drain electrode 175c is formed on the first, second, and third semiconductors 154a, 154b, and 154c, and the gate insulating layer 140.

As illustrated in the diagrams, the first, second, and third semiconductors 154a, 154b, and 154c may be formed below the data line 171.

In addition, the first semiconductor 154a and the second semiconductor 154b may be connected to each other, and the second semiconductor 154b may be connected to the third semiconductor 154c. However, the embodiments are not limited thereto. The first, second, and third semiconductors 154a, 154b, and 154c may be formed only on the first, second, and third gate electrodes 124a, 124b, and 124c, and the first semiconductor 154a, the second semiconductor 154b, and the third semiconductor 154c may be separated from each other.

The storage electrode line 177 transmits a constant voltage and mainly extends in a vertical direction to cross the gate line 121. The storage electrode line 177 may be formed in a center of each the subpixels PXa and PXb in a vertical direction. The storage electrode line 177 may overlap the storage electrode 133.

The storage electrode line 177 is formed to detour around edges in a region between the two subpixels PXa and PXb. The storage electrode line 177 may not overlap the first gate electrode 124a, the second gate electrode 124b, the auxiliary electrode 125, the first electrode 135, and the second electrode 137.

The same voltage as a voltage applied to the storage electrode 133 may be applied to the storage electrode line 177 or a different voltage from that of the storage electrode 133 may be applied. For example, a difference between a voltage applied to the storage electrode line 177 and a voltage applied to the storage electrode 133 may be about 3 V.

The data line 171 transmits a data signal and mainly extends in a vertical direction to cross the gate line 121. The data line 171 is formed in a direction approximately parallel to the storage electrode line 177 on the same layer level as the storage electrode line 177.

The first source electrode 173a is formed to protrude on the first gate electrode 124a from the data line 171. The first source electrode 173a may have a curved shape 'C' on the first gate electrode 124a.

The first drain electrode 175a is formed to be spaced apart from the first source electrode 173a on the first gate electrode 124a. A channel is formed on the first semiconductor 154a of an exposed portion between the first source electrode 173a and the first drain electrode 175a that are spaced apart from each other.

The first drain electrode 175a includes a first rod portion 176a that overlaps the first gate electrode 124a, a first extension portion 177a that extends from the first rod portion 176a, and a second rod portion 178a that extends from the first extension portion 177a.

The first rod portion 176a is surrounded by the first source electrode 173a. The first extension portion 177a has a wider width than that of the first rod portion 176a and is positioned between the first gate electrode 124a and the auxiliary electrode 125. The first extension portion 177a may overlap the first electrode 135. The second rod portion 178a may overlap the auxiliary electrode 125.

The first rod portion 176a, the first extension portion 177a, and the second rod portion 178a of the first drain electrode 175a may be positioned on the same layer level in a direction parallel to the gate line 121.

The second source electrode 173b protrudes on the second gate electrode 124b from the data line 171. The second source electrode 173b may have a curved shape on the second gate electrode 124b.

The second drain electrode 175b is formed to be spaced apart from the second source electrode 173b on the second gate electrode 124b. A channel is formed on the second semiconductor 154b of an exposed portion between the second source electrode 173b and the second drain electrode 175b that are spaced apart from each other.

The second drain electrode 175b includes a third rod portion 176b that overlaps the second gate electrode 124b, and a second extension portion 177b that extends from the third rod portion 176b. The third rod portion 176b is surrounded by the second source electrode 173b. The second extension portion 177b has a wider width than the third rod portion 176b and is positioned between the second gate electrode 124b and the third gate electrode 124c. The second extension portion 177b may overlap the second electrode 137.

The third source electrode 173c is connected to the second drain electrode 175b, particularly, to the second extension portion 177b of the second drain electrode 175b and is positioned on the third gate electrode 124c. The third source electrode 173c is shaped like a rod. A portion in which the third source electrode 173c overlaps a central portion of the third gate electrode 124c may have a wider width than other portions.

The third rod portion 176b, the second extension portion 177b, and the third source electrode 173c of the second drain electrode 175b may be positioned on the same line level in a direction parallel to the gate line 121.

The third drain electrode 175c is formed to be spaced apart from the third source electrode 173c on the third gate electrode 124c. A channel is formed on the third semiconductor 154c of an exposed portion between the third source electrode 173c and the third drain electrode 175c that are spaced apart from each other.

The aforementioned first gate electrode 124a, first semiconductor 154a, first source electrode 173a, and first drain electrode 175a constitute a first thin film transistor.

In addition, the second gate electrode 124b, the second semiconductor 154b, the second source electrode 173b, and the second drain electrode 175b constitute a second thin film transistor.

The third gate electrode 124c, the third semiconductor 154c, the third source electrode 173c, and the third drain electrode 175c constitute a third thin film transistor.

A first passivation layer 180 is formed on the data line 171, the first, second, and third source electrodes 173a, 173b, and 173c, and the first, second, and third drain electrodes 175a, 175b, and 175c. The first passivation layer 180 may be formed of an inorganic insulating material.

A first contact hole 185a through which at least a portion of the first drain electrode 175a is exposed, and a second contact hole 185b through which at least a portion of the second drain electrode 175b is exposed are formed in the first passivation layer 180.

The first contact hole 185a may extend to and expose the first extension portion 177a of the first drain electrode 175a therethrough and may be positioned between the first gate electrode 124a and the auxiliary electrode 125. The first contact hole 185a may overlap the first electrode 135.

The second contact hole 185b may extend to and expose the second extension portion 177b of the second drain electrode 175b therethrough and may be positioned between the second gate electrode 124b and the third gate electrode 124c. In addition, the second contact hole 185b may overlap the second electrode 137.

The first contact hole 185a and the second contact hole 185b are adjacent to each other. The first contact hole 185a and the second contact hole 185b are disposed up and down and side by side on a plane.

A second passivation layer 230 is formed on the first passivation layer 180. The second passivation layer 230 may be formed of an organic insulating material, particularly, a color filter.

The color filter may represent one of primary colors such as three primary colors of red, green, and blue. The color filter may also include a color filter representing white other than a primary color. A white color filter may be formed of a transparent organic material.

An opening 185c is formed on the second passivation layer 230 and overlaps the first contact hole 185a and the second contact hole 185b.

A single opening 185c instead of respective openings is formed at an overlapping portion with the first contact hole 185a and an overlapping portion with the second contact hole 185b. Accordingly, the opening 185c exposes the first passivation layer 180 positioned between the first contact hole 185a and the second contact hole 185b therethrough. An edge of the opening 185c surrounds edges of the first contact hole 185a and the second contact hole 185b.

A plurality of pixel electrodes 191 are formed on the second passivation layer 230.

A pixel electrode 191 includes a first subpixel electrode 191a and a second subpixel electrode 191b. The pixel electrode 191 may be formed of a transparent material such as ITO and IZO. The pixel electrode 191 may be formed of a transparent conductive material such as ITO or IZO, or reflective material such as aluminum, silver (Ag), chromium, or alloy thereof.

In this case, the first subpixel electrode 191a and the second subpixel electrode 191b may be simultaneously formed of the same material on the same layer of the second passivation layer 230 using one mask.

The first subpixel electrode 191a is connected to the first drain electrode 175a through the first contact hole 185a and the opening 185c, and the second subpixel electrode 191b is connected to the second drain electrode 175b through the second contact hole 185b and the opening 185c. Particularly, the first subpixel electrode 191a may be connected to the first extension portion 177a of the first drain electrode 175a, and the second subpixel electrode 191b may be connected to the second extension portion 177b of the second drain electrode 175b.

The first subpixel electrode 191a and the first drain electrode 175a are connected through the opening 185c, and the second subpixel electrode 191b and the second drain electrode 175b are connected through the opening 185c.

Detailed shapes of the first subpixel electrode 191a and the second subpixel electrode 191b will be described below.

The first subpixel electrode 191a and the second subpixel electrode 191b receive a data voltage from the first drain electrode 175a and the second drain electrode 175b, respectively. In this case, a portion of the data voltage applied to the second drain electrode 175b is divided through the third source electrode 173c such that amplitude of as voltage applied to the second subpixel electrode 191b is smaller than amplitude of a voltage applied to the first subpixel electrode 191a.

The first subpixel electrode 191a and the second subpixel electrode 191b to which a data voltage is applied generate an electric field together with a common electrode 270 of the upper panel 200 so as to determine a direction of liquid crystal molecules of the liquid crystal layer 3 between the two electrodes 191 and 270. According to the determined direction of liquid crystal molecules, luminance of light passing through the liquid crystal layer 3 is changed.

Hereinafter, the upper panel 200 will be described.

A light blocking member 220 is formed of transparent glass or plastic on a second substrate 210.

The light blocking member 220 is also referred to as a black matrix and prevents light leakage. The light blocking member 220 may overlap the gate line 121, the data line 171, the first, second, and third thin film transistors, the first contact hole 185a, the second contact hole 185b, and the opening 185c.

Although not illustrated, a plurality of color filters may be formed on the second substrate 210. According to the present exemplary embodiment, the second passivation layer 230 may include a color filter, and in this case, a color filter may not be formed on the second substrate 210.

The case in which the light blocking member 220 is formed on the upper panel 200 has been described thus far, but the embodiments are not limited thereto. The light blocking member 220 may be formed on the lower panel 100.

An overcoat 250 may be formed on the light blocking member 220, and the common electrode 270 may be formed on the overcoat 250.

An upper alignment layer (not shown) is formed on the common electrode 270. The upper alignment layer may be a vertical alignment layer.

The liquid crystal layer 3 has negative dielectric anisotropy, and liquid crystal molecules of the liquid crystal layer 3 are aligned such that a major axis of the liquid crystal molecules are perpendicular to surfaces of the two display panels 100 and 200 in a state in which an electric field is not present.

Although not illustrated, a lower polarizer is present below the lower panel 100 and an upper polarizer is present above the upper panel 200 in one embodiment. The polarizer polarizes light emitted from a backlight unit (not shown) in a predetermined direction so as to introduce the light into the liquid crystal display and re-polarizes light passing through the liquid crystal display in a predetermined direction to be externally discharged.

Figure 6:
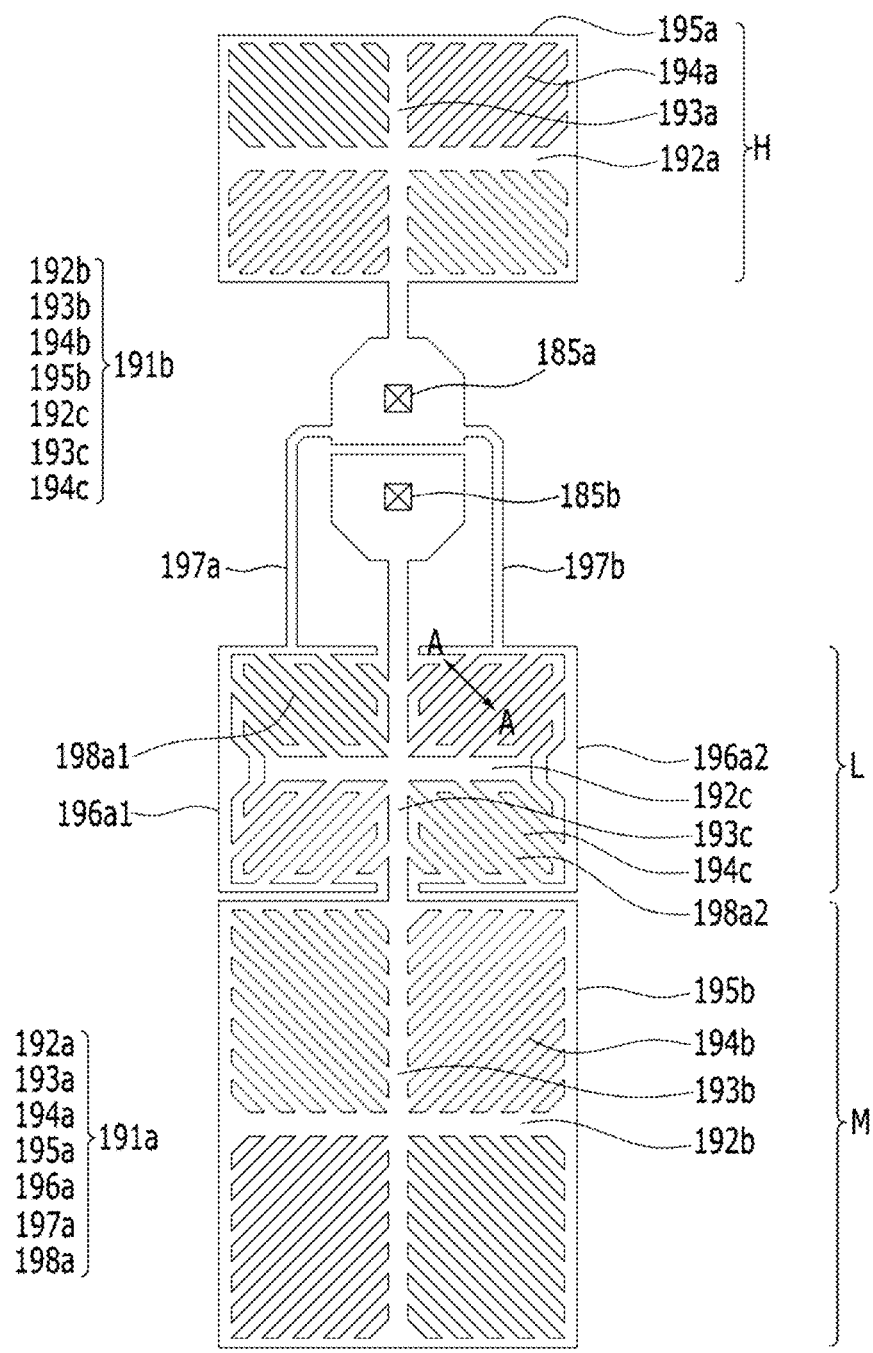
FIG. 6 is a drawing illustrating a pixel electrode of a liquid crystal display according to an exemplary embodiment.
Figure 7:
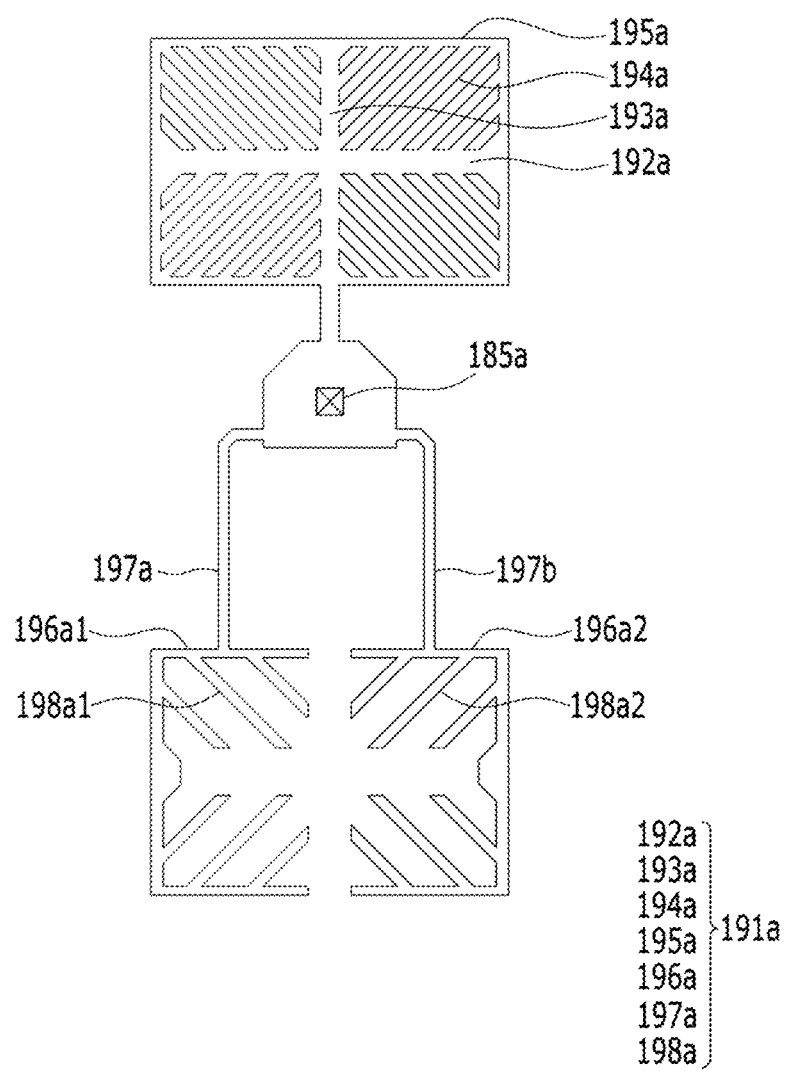
FIG. 7 is a drawing illustrating a first subpixel electrode of a liquid crystal display according to an exemplary embodiment.
Figure 8:
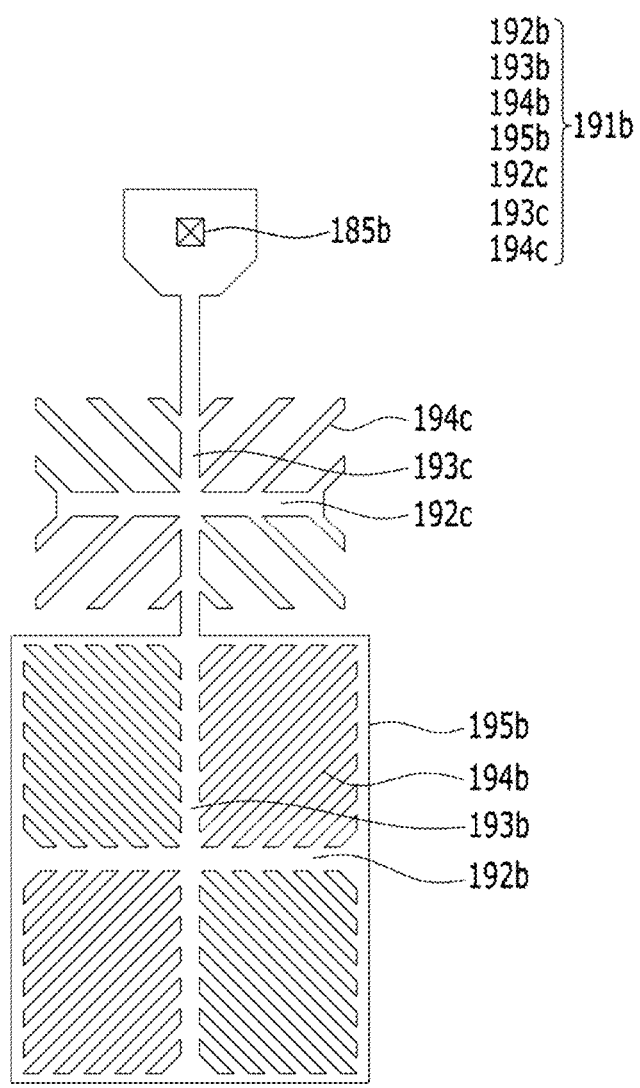
FIG. 8 is a drawing illustrating a second subpixel electrode of a liquid crystal display according to an exemplary embodiment.

With reference to FIGS. 6 to 8, a shape of a pixel electrode of a liquid crystal display according to an exemplary embodiment will be described.

FIG. 6 is a drawing illustrating a pixel electrode 191 of a liquid crystal display according to an exemplary embodiment. FIG. 7 is a drawing illustrating a first subpixel electrode 191a of a liquid crystal display according to an exemplary embodiment. FIG. 8 is a drawing illustrating a second subpixel electrode 191b of a liquid crystal display according to an exemplary embodiment.

Referring to FIGS. 6 to 8, the pixel electrode 191 may include the first subpixel electrode 191a and the second subpixel electrode 191b and may be divided into three subpixel regions.

The first subpixel electrode 191a is disposed in a first subpixel region H, the second subpixel electrode 191b is disposed in a second subpixel region M, and both the first subpixel electrode 191a and the second subpixel electrode 191b are disposed in a third subpixel region L.

The first subpixel electrode 191a positioned in the first subpixel region H may include first cross stem portions 192a and 193a positioned in the first subpixel region H and a plurality of first minute branches 194a that extend in a diagonal direction from the first cross stem portions 192a and 193a. The first subpixel electrode 191a may further include first and second body portions 196a1 and 196a2 that are positioned in the third subpixel region L and separated from each other, and a plurality of first and second slit portions 198a1 and 198a2 that extend in a diagonal direction from the first and second body portions 196a1 and 196a2, respectively.

The first cross stem portions 192a and 193a includes a first horizontal stem portion 192a and a first vertical stem portion 193a that crosses the first horizontal stem portion 192a. In addition, the first subpixel electrode 191a may be divided into four subregions by the first horizontal stem portion 192a and the first vertical stem portion 193a. Each subregion may include a plurality of first minute branches 194a and include a first edge portion 195a that is formed in the form of quadrangle along an edge while being connected to the first cross stem portions 192a and 193a and the first minute branches 194a.

One of the first minute branches 194a positioned in the four subregions diagonally extends in a left-upward direction from the first horizontal stem portion 192a or the first vertical stem portion 193a and another one of the first minute branches 194a diagonally extends in a right-upward direction from the first horizontal stem portion 192a or the first vertical stem portion 193a. Another one of the first minute branches 194a diagonally extends in a left-downward direction from the first horizontal stem portion 192a or the first vertical stem portion 193a and the other one of the first minute branches 194a diagonally extends in a right-downward direction from the first horizontal stem portion 192a or the first vertical stem portion 193a.

Each of the first minute branches 194a makes an angle of about 40 to 45 degrees with the gate line 121 or the first horizontal stem portion 192a. In addition, the first minute branches 194a of two neighboring subregions may be perpendicular to each other.

The second subpixel electrode 191b positioned in the second subpixel region M includes a second cross stem portion including a second horizontal stem portion 192b and a second vertical stem portion 193b that crosses the second horizontal stem portion 192b. In addition, the second subpixel region M may be divided into four subregions by the second horizontal stem portion 192b and the second vertical stem portion 193b. Each subregion may include a plurality of second minute branches 194b and include a second edge portion 195b that is formed in the form of quadrangle along an edge while being connected to the second cross stem portion and the second minute branches 194b.

One of the second minute branches 194b positioned in the four subregions diagonally extends in a left-upward direction from the second horizontal stem portion 192b or the second vertical stem portion 193b and another one of the second minute branches 194b diagonally extends in a right-upward direction from the second horizontal stem portion 192b or the second vertical stem portion 193b. Another one of the second minute branches 194b diagonally extends in a left-downward direction from the second horizontal stem portion 192b or the second vertical stem portion 193b and the other one of the second minute branches 194b diagonally extends in a right-downward direction from the second horizontal stem portion 192b or the second vertical stem portion 193b.

Each of the second minute branches 194b makes an angle of about 40 to 45 degrees with the gate line 121 or the second horizontal stem portion 192b. In addition, the second minute branches 194b of two neighboring subregions may be perpendicular to each other.

The first subpixel electrode 191a and the second subpixel electrode 191b are positioned in the third subpixel region L.

The first subpixel electrode 191a positioned in the third subpixel region L may include the first body portion 196a1 and the second body portion 196a2 that are separated from each other, and the plurality of first slit portions 198a1 and the plurality of second slit portions 198a2 that extend in a diagonal direction from the first body portion 196a1 and the second body portion 196a2, respectively.

In addition, the first subpixel electrode 191a may include the first vertical stem portion 193a positioned in the first subpixel region H, and a first connection portion 197a and a second connection portion 197b that connect the first body portion 196a1 and the second body portion 196a2 that are positioned in the third subpixel region L and are separated from each other.

The second subpixel electrode 191b positioned in the third subpixel region L may include third cross stem portions 192c and 193c including a third vertical stem portion 193c connected to the second vertical stem portion 193b positioned in the second subpixel region M and a third horizontal stem portion 192c that crosses the third vertical stem portion 193c, and a plurality of third minute branches 194c that extend from the third cross stem portions 192c and 193c in a diagonal direction.

The first body portion 196a1 and the second body portion 196a2 are separated from each other with respect to the third cross stem portions 192c and 193c.

The first body portion 196a1 and the plurality of first slit portions 198a1 may be disposed on the left of the third cross stem portions 192c and 193c, and the second body portion 196a2 and a plurality of second slit portions 198a2 may be disposed on the right of the third cross stem portions 192c and 193c.

The second vertical stem portion 193b and the third vertical stem portion 193c of the second subpixel electrode 191b are connected to each other.

As described above, different voltages are applied to the first subpixel electrode 191a and the second subpixel electrode 191b.

In this case, the first and second slit portions 198a1 and 198a2 and the plurality of third minute branches 194c may be alternately disposed and a horizontal direction of electric fields may be formed between the first and second slit portions 198a1 and 198a2 and the plurality of third minute branches 194c.

That is, different types of electric fields are formed in the first subpixel region H in which the first subpixel electrode 191a is positioned, the second subpixel region M in which the second subpixel electrode 191b is positioned, and the third subpixel region L in which the first subpixel electrode 191a and the second subpixel electrode 191b are positioned. Although described later, a highest electric field is formed in the first subpixel region H, a middle electric field is formed in the second subpixel region M, and a lowest electric field is formed in the third subpixel region L. Accordingly, a lying degree of liquid crystal modules is changed for each respective region, thereby further enhancing side visibility.

Hereinafter, various arrangements of a first subpixel electrode and a second subpixel electrode positioned in a third subpixel region of a liquid crystal display according to an exemplary embodiment will be described.

Figure 9:
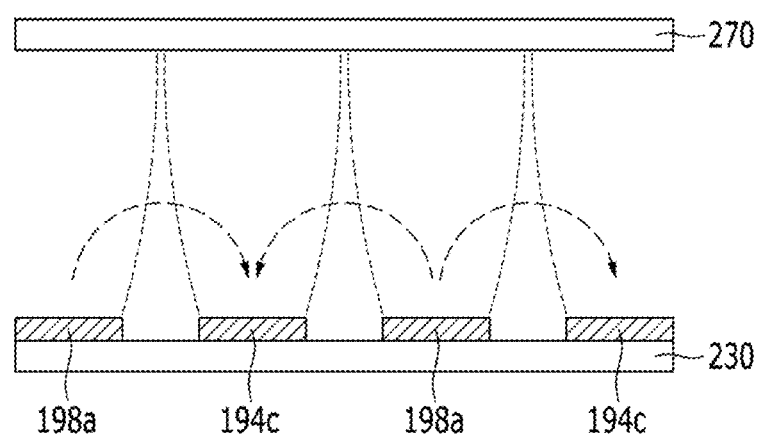
FIG. 9 is a cross-sectional view of a second subpixel electrode taken along a line A-A of FIG. 6 according to an exemplary embodiment.
Figure 10:
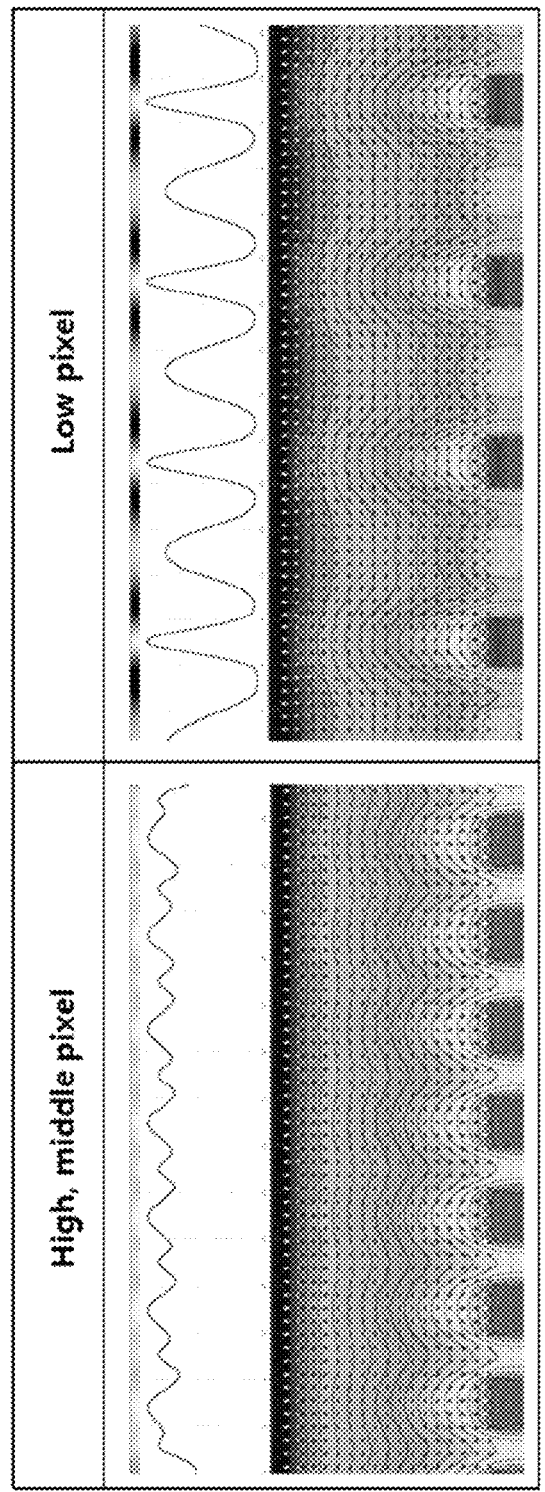
FIG. 10 is a drawing illustrating luminance in a third subpixel region.
Figure 11:
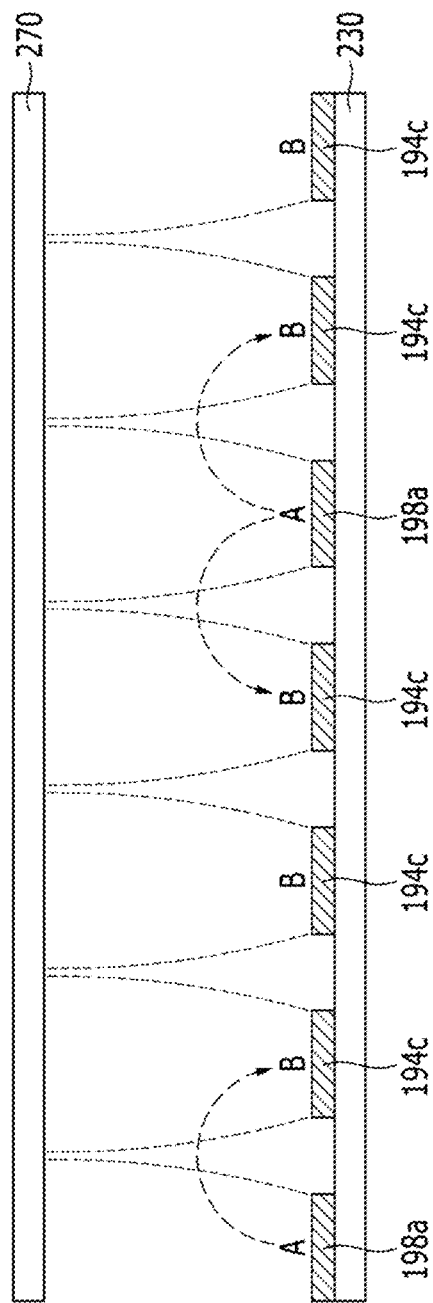
FIG. 11 is a cross-sectional view of a second subpixel electrode taken along a line A-A of FIG. 6 according to another exemplary embodiment.
Figure 12:
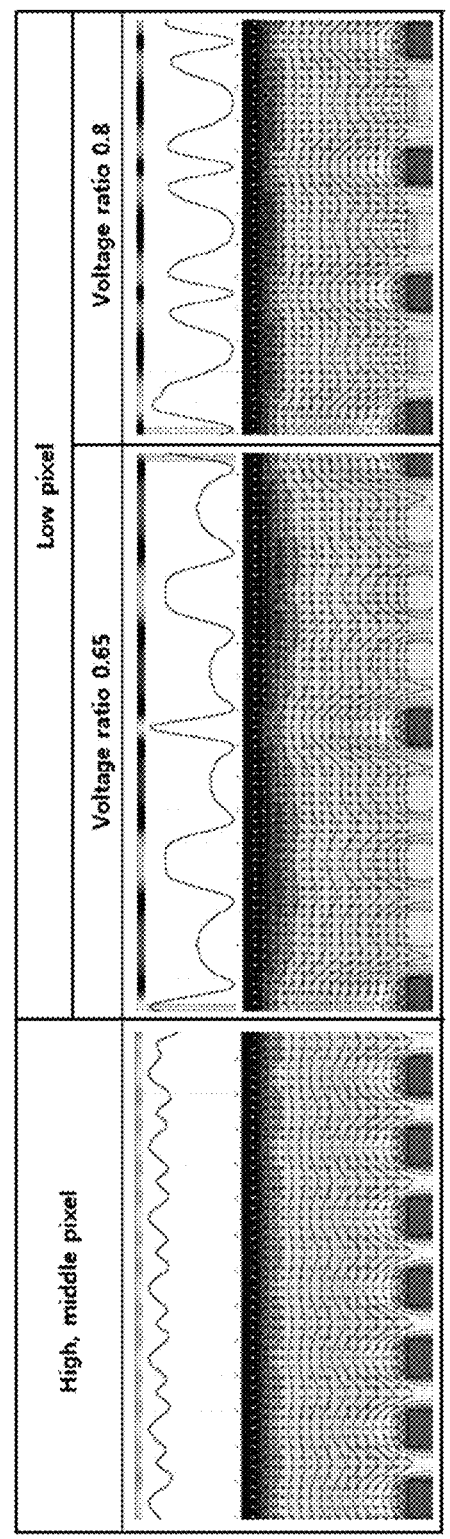
FIG. 12 is a drawing illustrating luminance in a third subpixel region.
Figure 13:
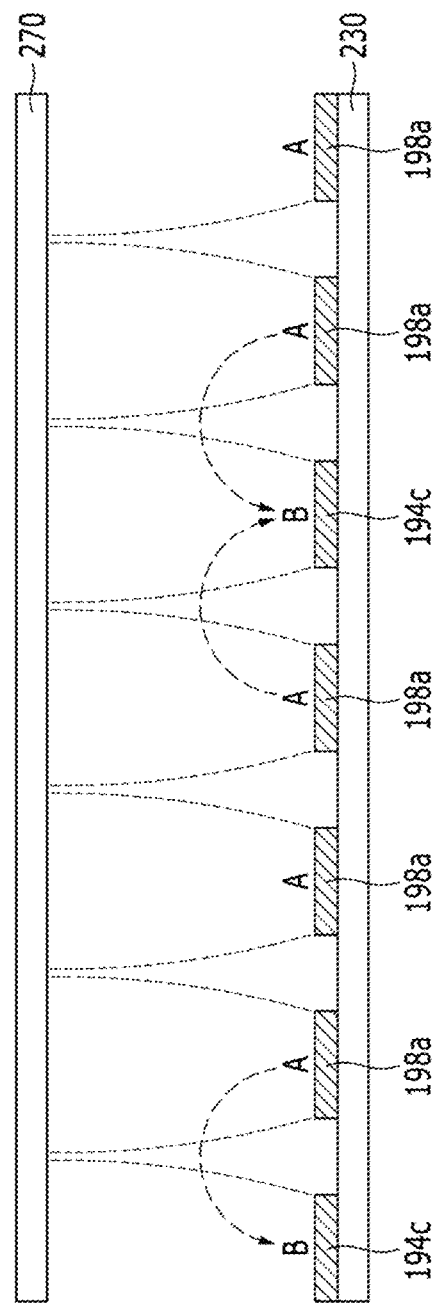
FIG. 13 is a cross-sectional view of a second subpixel electrode taken along a line A-A of FIG. 6 according to another exemplary embodiment.

FIGS. 9, 11, and 13 are cross-sectional views taken along a line A-A of FIG. 6, and FIGS. 10 and 12 are drawings illustrating luminance in the third subpixel region L.

Referring to FIGS. 9 and 10, the liquid crystal display according to an exemplary embodiment may be configured in such a way that slit portions 198a of the first subpixel electrode 191a and the third minute branches 194c of the second subpixel electrode 191b are alternately disposed.

The slit portion 198a and third minute branches 194c may form a vertical direction of an electric field together with the common electrode 270, and the slit portion 198a and third minute branches 194c may form a horizontal direction of the electric field.

In this case, constant luminance is shown in a first subpixel region (high) and a second subpixel region (middle), whereas high luminance and low luminance are alternately shown in a third subpixel region (low).

Referring to FIGS. 11 and 12, a liquid crystal display according to another exemplary embodiment may be configured in such a way that the plurality of third minute branches 194c of the second subpixel electrode 191b are disposed between the slit portions 198a of the first subpixel electrode 191a.

The slit portions 198a and third minute branches 194c may form a vertical direction of the electric field together with the common electrode 270, and the slit portion 198a and the third minute branches 194c may form a horizontal direction of the electric field.

In this case, constant luminance is shown in a first subpixel region (high) and a second subpixel region (middle), whereas high luminance and low luminance are alternately shown in a third subpixel region (low). In addition, it may be seen that luminance is also changed according to a voltage applied to the slit portions 198a and the third minute branches 194c in the third subpixel region (low).

Referring to FIG. 13, a liquid crystal display according to another exemplary embodiment may be configured in such a way that the plurality of slit portions 198a of the first subpixel electrode 191a are disposed between the third minute branches 194c of the neighboring second subpixel electrodes 191b.

As such, a liquid crystal display according to an exemplary embodiment may express various luminances by adjusting arrangement of the slit portions 198a of the first subpixel electrode 191a and third minute branches 194c of the second subpixel electrode 191b or adjusting a voltage applied to the slit portions 198a and the third minute branches 194c.

Figure 14:
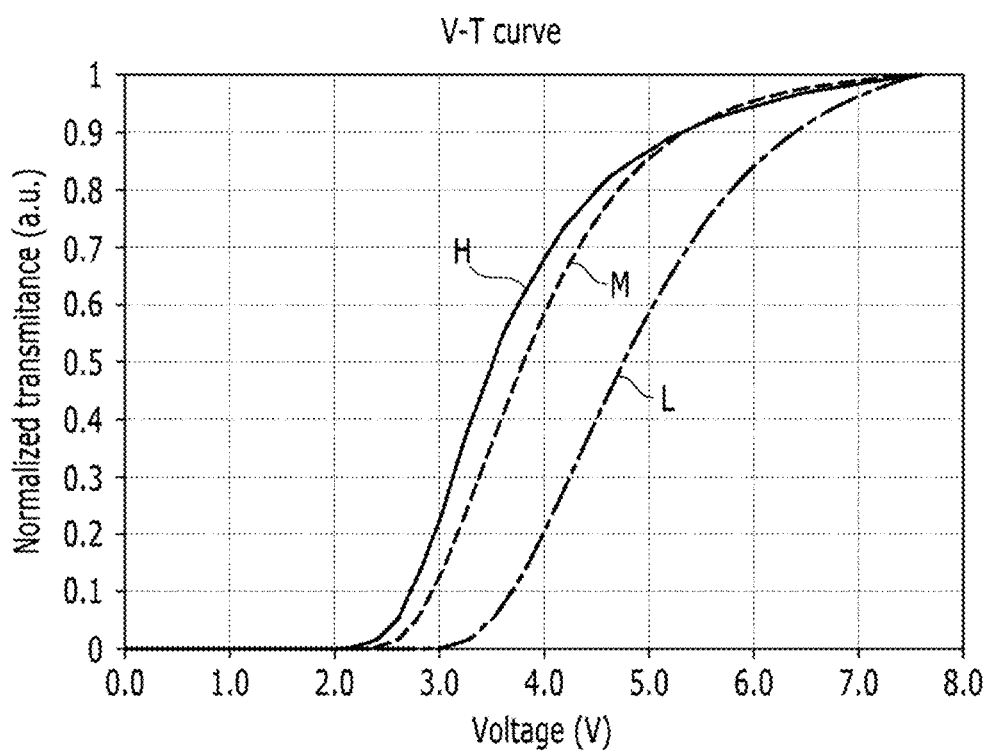
FIG. 14 is a drawing illustrating a V-T curve according to voltage application in each region.

FIG. 14 is a drawing illustrating a V-T curve according to voltage application in each region.

As seen from FIG. 14, different V-T curves are shown for respective regions in one pixel electrode in a liquid crystal display according to an exemplary embodiment.

It may be seen that only the first subpixel electrode 191a to which a highest voltage is applied is positioned in the first subpixel region H, and in this case, transmittance of liquid crystal molecules based on the same voltage is highest.

It may be seen that only the second subpixel electrode 191b to which a lowest voltage is applied is positioned in the second subpixel region M, and in this case, transmittance of liquid crystal molecules based on the same voltage is middle.

It may be seen that the plurality of slit portions 198a to which a highest voltage is applied and the plurality of third minute branches 194c to which a lowest voltage is applied are alternately disposed in the third subpixel region L, and in this case, transmittance of liquid crystal molecules based on the same voltage is lowest.

That is, as described above, in a liquid crystal display according to an exemplary embodiment, three regions having different voltage ratios in one pixel electrode are present. Accordingly, a lying degree of liquid crystal modules is changed for each respective region, and a viewer may uniformly see as head, a body, and a tail of liquid crystal from the front and the side, thereby improving visibility.

That is, conventionally, in order to improve visibility, a pixel region is divided into a first subpixel electrode region and as second subpixel electrode region, and different voltages are applied to the respective subpixel electrodes.

However, a liquid crystal display according to an exemplary embodiment may further visibility compared with the case in which a pixel region is divided into two regions by dividing a pixel region into three regions with different voltage ratios while using the same transistor structure.

Although not illustrated, in the case of a display device according to a Comparative Example of the inventive concept, in order to divide a pixel region into three regions, some of first subpixel electrodes are formed on another layer so as to vertically overlap each other across a second subpixel electrode and an insulating layer. However, in the case of the display device according to Comparative Example of the inventive concept, some of the first subpixel electrodes need to be separately formed during formation of a pixel electrode, and thus a problem arises in that manufacturing processes may be complicated.

However, a display device according to an exemplary embodiment may improve visibility and simultaneously reduce manufacturing costs by forming the first subpixel electrode 191a and the second subpixel electrode 191b on the same layer level to divide a pixel electrode into three regions without division of the pixel electrode into separate layers.

Hereinafter, with reference to FIGS. 15 to 18, an equivalent circuit to which one pixel of a liquid crystal display according to an exemplary embodiment is applicable will be described.

FIGS. 15 to 18 are equivalent circuit diagrams of one pixel of a liquid crystal display according to exemplary embodiments.

Figure 15:
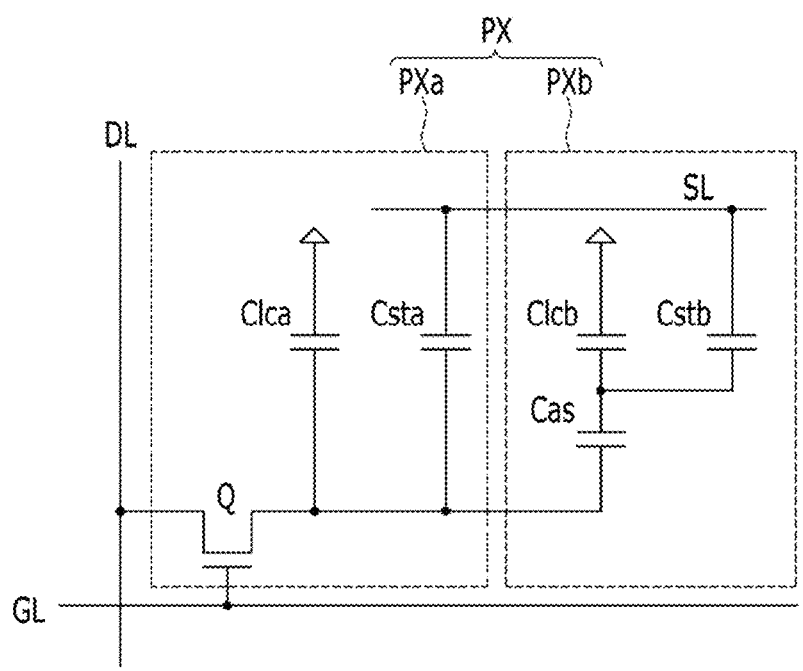
FIGS. 15, 16, 17, and 18 are equivalent circuit diagrams of one pixel of as liquid crystal display according to exemplary embodiments.

Referring to FIG. 15, a liquid crystal display according to an exemplary embodiment includes signal lines including a plurality of gate lines GL, a plurality of data lines DL, and a plurality of storage electrode lines SL, and a plurality of pixels PX connected to the signal lines. Each pixel PX includes a pair of first and second subpixels PXa and PXb, a first subpixel electrode is formed in the first subpixel PXa, and a second subpixel electrode is formed in the second subpixel PXb.

A liquid crystal display according to an exemplary embodiment further includes a switching element Q connected to the gate lines GL, and the data lines DL, the first liquid crystal capacitor Clca and a first storage capacitor Csta that are connected to the switching element Q and formed in the first subpixel PXa. A second liquid crystal capacitor Clcb and a second storage capacitor Cstb that are connected to the switching element Q and formed in the second subpixel PXb, and an auxiliary capacitor Cas formed between the switching element Q and the second liquid crystal capacitor Clcb.

The switching element Q is a three-terminal element such as a thin film transistor included in the lower panel 100, control terminal of the switching element Q is connected to the gate lines GL, an input terminal of the switching element Q is connected to the data lines DL, and an output terminal of the switching element Q is connected to the first liquid crystal capacitor Clca, the first storage capacitor Csta, and the auxiliary capacitor Cas.

One side terminal of the auxiliary capacitor Cas is connected to the output terminal of the switching element Q and the other side terminal is connected to the second liquid crystal capacitor Clcb and the second storage capacitor Cstb.

A charging voltage of the second liquid crystal capacitor Clcb may be lowered by a charging voltage of the first liquid crystal capacitor Clca by the auxiliary capacitor Cas, thereby improving the side visibility of the liquid crystal display.

Figure 16:
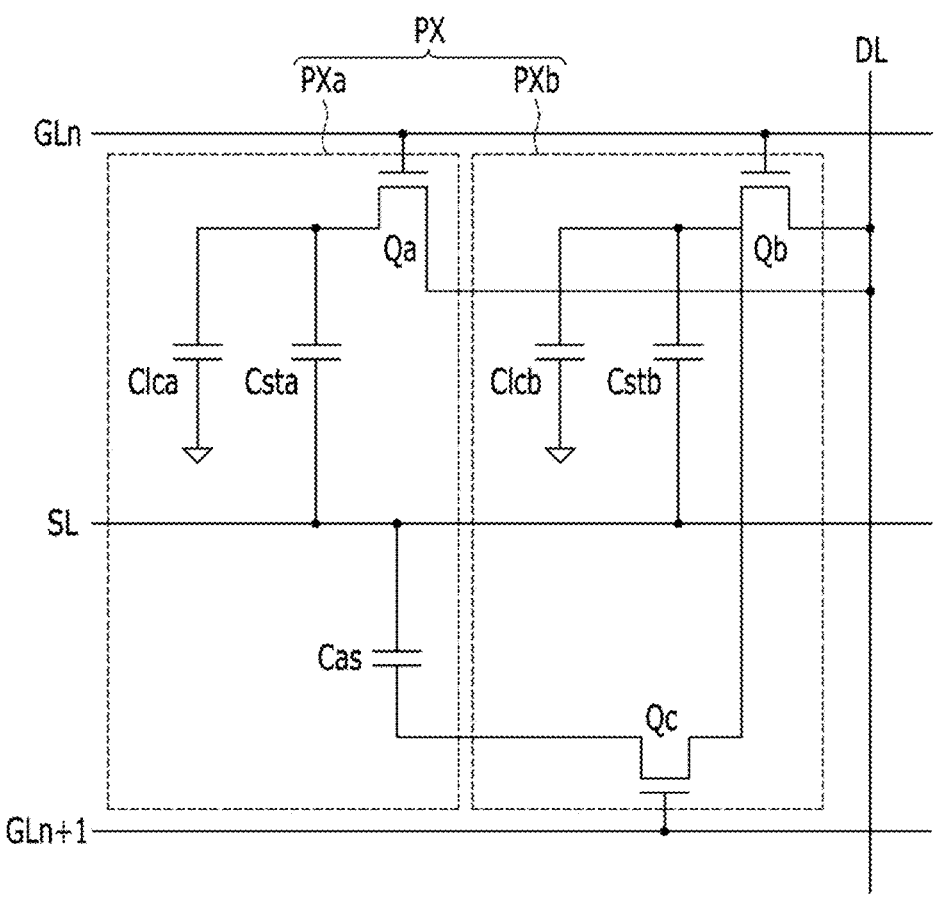

Hereinafter, another exemplary embodiment of FIG. 16 will be described.

A liquid crystal display according to another exemplary embodiment includes signal lines including a plurality of gate lines GLn and GLn+1, a plurality of data lines DL, and a plurality of storage electrode lines SL, and a plurality of pixels PX connected to the signal lines. Each pixel PX includes a pair of first and second subpixels PXa and PXb, a first subpixel electrode is formed in the first subpixel PXa, and a second subpixel electrode is formed in the second subpixel.

A liquid crystal display according to an exemplary embodiment further include a first switching element Qa and a second switching element Qb that are connected to the gate lines GLn and the data lines DL. A first liquid crystal capacitor Clca and a first storage capacitor Csta are connected to the first switching element Qa and formed in the first subpixel PXa. A second liquid crystal capacitor Clcb and a second storage capacitor Cstb are connected to the second switching element Qb and formed in the second subpixel PXb. A third switching element Qc is connected to the second the second switching element Qb and switched by a gate line GLn+1 of a next terminal, and an auxiliary capacitor Cas is connected to the third switching element Qc.

The first switching element Qa and the second switching element Qb are each a three-terminal element such as a thin film transistor included in the lower panel 100. A control terminal of each of the first switching element Qa and the second switching element Qb is connected to a gate line GLn, an input terminal of each of the first switching element Qa and the second switching element Qb is connected to the data lines DL, and output terminals of the first switching element Qa and the second switching element Qb are connected to the first liquid crystal capacitor Clca and the first storage capacitor Csta, and the second liquid crystal capacitor Clcb and the second storage capacitor Cstb, respectively.

The third switching element Qc is also a three-terminal element such as a thin film transistor included in the lower panel 100. A control terminal of the third switching element Qc is connected to the gate line GLn+1 of a next terminal, an input terminal of the third switching element Qc is connected to the second liquid crystal capacitor Clcb, and an output terminal of the third switching element Qc is connected to the auxiliary capacitor Cas.

One side terminal of the auxiliary capacitor Cas is connected to the output terminal of the third switching element Qc and the other side terminal is connected to the storage electrode line SL.

With regard to an operation of a liquid crystal display according to this exemplary embodiment, when a gate-on voltage is applied to the gate line GLn, the first switching element and the second switching element Qa and Qb connected to the gate line GLn are turned on, and a data voltage of the data line DL is applied to first and second subpixel electrodes.

Then when a gate-off voltage is applied to the gate line GLn and a gate-on voltage is applied to the gate line GLn+1 of a next terminal, the first and second switching elements Qa and Qb are turned off and the third switching element Qc is turned on. Accordingly, electric charges of the second subpixel electrode connected to the output terminal of the second switching element Qb are introduced into the auxiliary capacitor Cas to drop a voltage of the second liquid crystal capacitor Clcb.

As such, charging voltages of the first and second liquid crystal capacitors Clca and Clcb may be different to improve the side visibility of the liquid crystal display.

Figure 17:
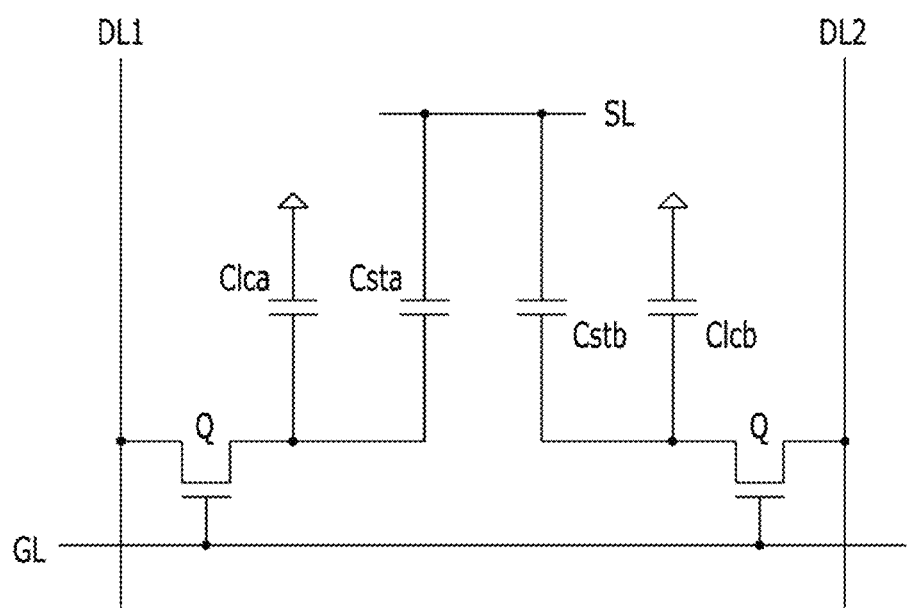

Hereinafter, another exemplary embodiment of FIG. 17 will be described.

A liquid crystal display according to another exemplary embodiment includes signal lines including the plurality of gate lines GL, the plurality of data lines DM and DL2, and the plurality of storage electrode lines SL, and the plurality of pixels PX connected to the signal lines. Each pixel PX includes a pair of first and second liquid crystal capacitors Clca and Clcb and first and second storage capacitors Csta and Cstb.

Each subpixel includes one liquid crystal capacitor and a storage capacitor and further includes one thin film transistor Q. A thin film transistor Q of two subpixels belonging to one pixel is connected to the same gate line GL but is connected to different data lines DL1 and DL2. Different levels of data voltages are simultaneously applied to different data lines DL1 and DL2 such that the first and second liquid crystal capacitors Clca and Clcb of two subpixels have different charging voltages. As a result, the side visibility of the liquid crystal display may be improved.

Hereinafter, another exemplary embodiment of FIG. 18 will be described.

Figure 18:
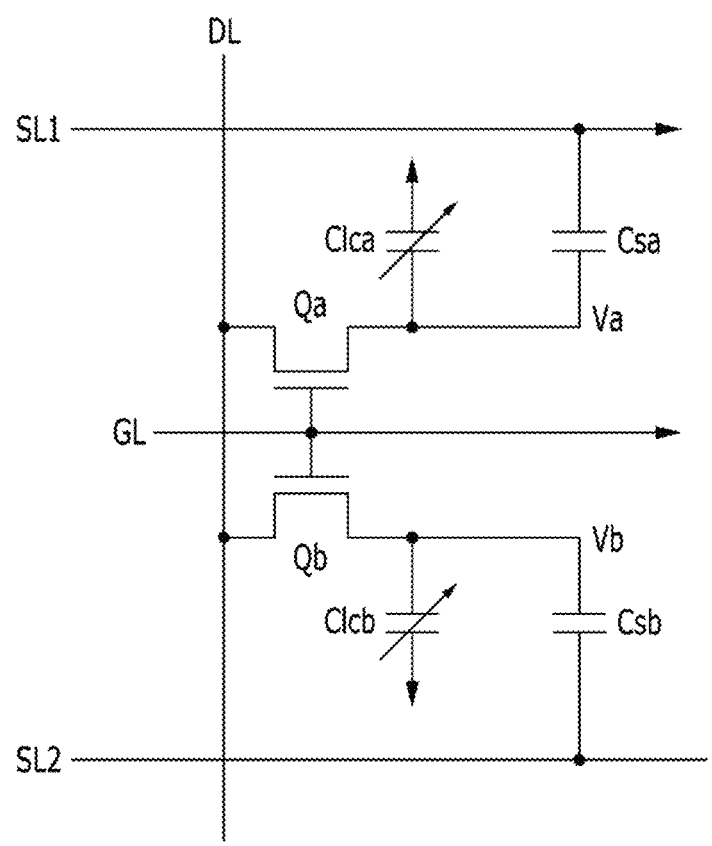

As shown in FIG. 18, a liquid crystal display according to an exemplary embodiment includes a first switching element Qa and a second switching element Qb that are connected to a gate line GL, a data line DL, a first power line SL1, a second power line SL2, the gate line GL, and the data line DL.

A liquid crystal display according to an exemplary embodiment further includes an auxiliary boost capacitor Csa and the first liquid crystal capacitor Clca that are connected to the first switching element Qa, and an auxiliary reducing capacitor Csb and the second liquid crystal capacitor Clcb that are connected to the second switching element Qb.

The first switching element Qa and the second switching element Qb include a three-terminal element such as a thin film transistor. The first switching element Qa and the second switching element Qb are connected to the same gate line GL and the same data line DL and are turned on at the same timing to output the same data signal.

A swing voltage at a predetermined period is applied to the first power line SL1 and the second power line SL2. A first low voltage is applied to the first power line SL1 for a predetermined period (e.g., 1H) and a first high voltage is applied for a next predetermined period. A second high voltage is applied to the second power line SL2 for a predetermined period and a second low voltage is applied for a next predetermined period. In this case, a first period and a second period are repeated a plurality of times so as to apply a swing voltage to the first power line SL1 and the second power line SL2. In this case, the first low voltage and the second low voltage may be the same and the first high voltage and the second high voltage may be the same.

The auxiliary boost capacitor Csa is connected to the first switching element Qa and the first power line SL1, and the auxiliary reducing capacitor Csb is connected to the second switching element Qb and the second power line SL2.

A voltage Va of a terminal (hereinafter, referred to as a 'first terminal') of a portion in which the auxiliary boost capacitor Csa is connected to the first switching element Qa is reduced when a first low voltage is applied to the first power line SL1, and the voltage Va is boosted when a first high voltage is applied to the first power line SL1. Then as a voltage of the first power line SL1 swings, the voltage Va of the first terminal also swings.

<Description of symbols>

| | |
|---|---|
| 100, 200: display panel | 191: pixel electrode |
| 191a: first subpixel electrode | 191b: second subpixel electrode |
| 192a, b, c: horizontal stem portions | 193a, b, c: vertical stem portions |
| 194a, b, c: minute branches | 195a, b: edge portions |
| 196a: body portion | 197: connection portion |
| 198a: slit portion | |

While the inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A liquid crystal display comprising:
   a first substrate;
   a pixel electrode positioned on the first substrate, including a first subpixel electrode and a second subpixel electrode, and divided into three subregions;
   a second substrate facing the first substrate;
   a common electrode disposed on the second substrate; and
   a liquid crystal layer positioned between the first substrate and the second substrate,
   wherein:
   the first subpixel electrode comprises:
   a first cross stem portion positioned in a first subpixel region and a plurality of first minute branches extending in a diagonal direction from the first cross stem portion;

first and second body portions that are positioned in a third subpixel region and separated from each other; and a plurality of first and second slit portions that extend in a diagonal direction from the first and second body portions, respectively; and the second subpixel electrode comprises:

a second cross stem portion positioned in a second subpixel region and a plurality of second minute branches that extend in a diagonal direction from the second cross stem portion; and a third cross stem portion positioned in the third subpixel region and a plurality of third minute branches that extend in a diagonal direction from the third cross stem portion.

2. The liquid crystal display of claim 1, wherein:
the first subpixel electrode and the second subpixel electrode are formed of a same material on a same layer level.

3. The liquid crystal display of claim 1, wherein:
the first and second slit portions are alternately disposed with the third minute branches.

4. The liquid crystal display of claim 1, wherein:
the first and second slit portions and the third minute branches are alternately disposed.

5. The liquid crystal display of claim 3, wherein:
the third minute branches are disposed between neighboring first slit portions, and the third minute branches are disposed between neighboring second slit portions.

6. The liquid crystal display of claim 3, wherein:
the first slit portions are disposed between neighboring third minute branches, and the second slit portions are disposed between neighboring third minute branches.

7. The liquid crystal display of claim 1, wherein:
the first subpixel electrode includes:

a first connection portion connecting the first cross stem portion and the first body portion; and a second connection portion connecting the first cross stem portion and the second body portion.

8. The liquid crystal display of claim 1, wherein:
the first body portion and the second body portion are separated from each other based on the third cross stem portion.

9. The liquid crystal display of claim 8, wherein:
the first body portion and the first slit portions are disposed on the left of the third cross stem portion, and the second body portion and the second slit portions are disposed on the right of the third cross stem portion.

10. The liquid crystal display of claim 1, wherein:
each of the first, second, and third cross stem portions includes a horizontal stem portion and a vertical stem portion that cross each other.

11. The liquid crystal display of claim 10, wherein:
the first, second, and third minute branches are disposed to make an angle of 40 to 50 degrees with respect to the horizontal stem portions.

12. The liquid crystal display of claim 1, wherein:
different voltages are configured to be applied to the first subpixel electrode and the second subpixel electrode.

13. The liquid crystal display of claim 12, wherein:
a voltage configured to be applied to the first subpixel electrode is higher than a voltage configured to be applied to the second subpixel electrode.

14. The liquid crystal display of claim 13, wherein:
a horizontal direction of an electric field is configured to be formed between the first and second slit portions and the third minute branches.

15. The liquid crystal display of claim 1, wherein:
the first subpixel electrode further includes a first edge portion that is connected to the first cross stem portion and the first minute branches along an edge.

16. The liquid crystal display of claim 1, wherein:
the second subpixel electrode further includes a second edge portion that is connected to the second cross stem portion and the second minute branches along an edge.

* * * * *